(12) United States Patent
Ketcham et al.

(10) Patent No.: US 8,634,513 B2
(45) Date of Patent: Jan. 21, 2014

(54) SYSTEM FOR EXCHANGING A COMPONENT OF A NUCLEAR REACTOR

(75) Inventors: David P. Ketcham, Charlotte, NC (US); Stafford L. Turner, Ooltewah, TN (US); Brian C. Campbell, Hixson, TN (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 511 days.

(21) Appl. No.: 12/885,640

(22) Filed: Sep. 20, 2010

(65) Prior Publication Data

US 2012/0069947 A1 Mar. 22, 2012

(51) Int. Cl.
*G21C 19/00* (2006.01)

(52) U.S. Cl.
USPC .......................................... 376/260; 376/368

(58) Field of Classification Search
USPC .................................................. 376/260, 368
See application file for complete search history.

(56) References Cited

U.S. PATENT DOCUMENTS

| 4,288,290 A | * | 9/1981 | Saima et al. | 376/245 |
| 4,728,484 A | * | 3/1988 | Kodama et al. | 376/260 |
| 5,784,426 A | * | 7/1998 | Burner et al. | 376/260 |
| 2009/0067564 A1 | * | 3/2009 | Salazar et al. | 376/260 |

OTHER PUBLICATIONS

International Search Report for PCT/US2011/050744 dated Jun. 4, 2013 (Form PCT/ISA/210).
Written Opinion of the International Searching Authority for PCT/US2011/050744 dated Jun. 4, 2013 (FormPCT/ISA/237).
International Preliminary Report on Patentability for PCT/US2011/050744 dated Jun. 18, 2013 (Forms PCT/IB/373, PCT/ISA/237).

* cited by examiner

*Primary Examiner* — Timothy A Brainard
(74) *Attorney, Agent, or Firm* — Richard J. Coldren; Westinghouse Electric Company LLC

(57) ABSTRACT

A system for installing or removing a component of a nuclear reactor, such as a CRDM, includes a riser apparatus having a lift assembly structured to hold and support the component and a first drive assembly coupled to the lift assembly and structured to selectively move the lift assembly and the component along a length of the riser apparatus, and a transition cart movable along an under vessel area of the nuclear reactor and having a pivot mechanism, wherein the riser apparatus is selectively engageable with the pivot mechanism and the pivot mechanism is structured to selectively rotate the riser apparatus from a horizontal position to a vertical position. The riser apparatus may also include a second drive assembly structured to selectively move the riser apparatus relative to the transition cart in a direction parallel to a longitudinal axis of the riser apparatus.

25 Claims, 19 Drawing Sheets

SYSTEM FOR EXCHANGING A COMPONENT OF A NUCLEAR REACTOR

BACKGROUND OF THE INVENTION

1. Field of the Invention

The present invention relates to nuclear reactor vessels, and in particular to a system that may be used to simplify and facilitate the installation, removal and/or replacement of a component of a nuclear reactor vessel such as a control rod drive mechanism (CRDM).

2. Related Art

In a Boiling Water Reactor (BWR) type nuclear reactor, a number of control rods are provided within the reactor vessel, each control rod being positioned between a number of (e.g., four) nuclear fuel bundles. The power output of a BWR is controlled by the elevation position of the control rods within the fuel bundles. The position of each control rod is controlled by a control rod drive mechanisms (CRDM), which selectively raises and lowers the control rod within the BWR vessel.

Some components, such as seals, of a CRDM wear over time. It is thus necessary from time to time to replace one or more CRDMs in a BWR vessel. However, not all BWR power plants are designed and configured in the same manner. Thus, there is a need for an system that simplifies and facilitates the installation, removal and/or replacement of CRDMs or other components in nuclear reactor vessels such as BWRs that has the flexibility to accommodate for different power plant designs and configurations.

SUMMARY OF THE INVENTION

In one embodiment, a system for installing or removing a component of a nuclear reactor, such as a CRDM, is provided that includes a riser apparatus having a lift assembly structured to hold and support the component and a first drive assembly coupled to the lift assembly and structured to selectively move the lift assembly and the component along a length of the riser apparatus, and a transition cart movable along an under vessel area of the nuclear reactor and having a pivot mechanism, wherein the riser apparatus is selectively engageable with the pivot mechanism and the pivot mechanism is structured to selectively rotate the riser apparatus from a horizontal position to a vertical position. In addition, in the exemplary embodiment, the riser apparatus includes a second drive assembly structured to selectively move the riser apparatus relative to the transition cart in a direction parallel to a longitudinal axis of the riser apparatus.

In another embodiment, an apparatus for raising and lowering a component of a nuclear reactor is provided that includes a lift assembly structured to hold and support the component, and a drive assembly coupled to the lift assembly and structured to selectively move the lift assembly and the component along a length of the apparatus, wherein the drive assembly includes a lead screw, a motor operatively coupled to a first end of the lead screw for rotating the lead screw, a nut housing coupled to the lead screw, a first pulley coupled to the nut housing, and a cable coupled to the first pulley and the lift assembly, wherein rotation of the lead screw by the motor causes the nut housing to move along the lead screw and the lift assembly to move along the length of the riser apparatus.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

A further understanding of the invention can be gained from the following description of the preferred embodiments when read in conjunction with accompanying drawings in which.

DESCRIPTION OF THE PREFERRED EMBODIMENT

Figure 1:
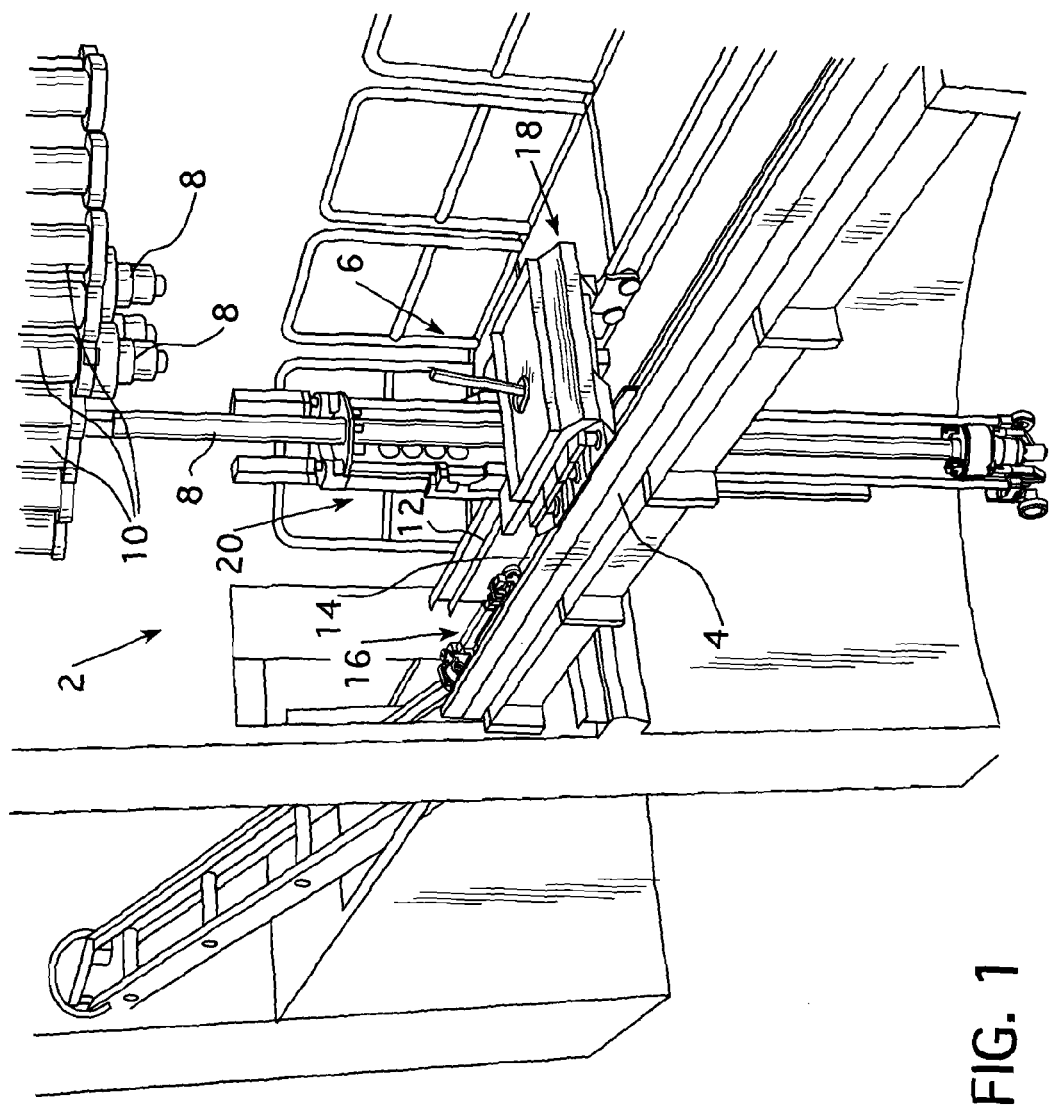
FIG. 1 is a schematic diagram of an under vessel area of a BWR showing a component exchange system according to an exemplary embodiment of the invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

FIG. 1 is a schematic diagram of an under vessel area 2 including under vessel carousel 4 of a BWR showing component exchange system 6 according to an exemplary embodiment of the invention which may be used to remove and replace a CRDM such as CRDM 8 (or another component of the BWR that must be lifted and/or lowered). In a BWR, the reactor vessel has a bottom head that houses a number of CRDM guide tubes 10, each of which houses a respective CRDM 8. Each CRDM 8 is held in place by a number of bolts at a flange to flange connection between the CRDM guide tube 10 and the CRDM 8. Carousel 4 in the illustrated embodiment includes a pair of top rails 12 and a pair of bottom rails 14 which each, as described elsewhere herein, support for movement thereon a component of component exchange system 6. Alternative carousels in alternative under vessel areas may only include top rails 12. Such alternative under vessel areas may still employ various aspects and principles of the present invention that are described in detail herein.

Figure 15:
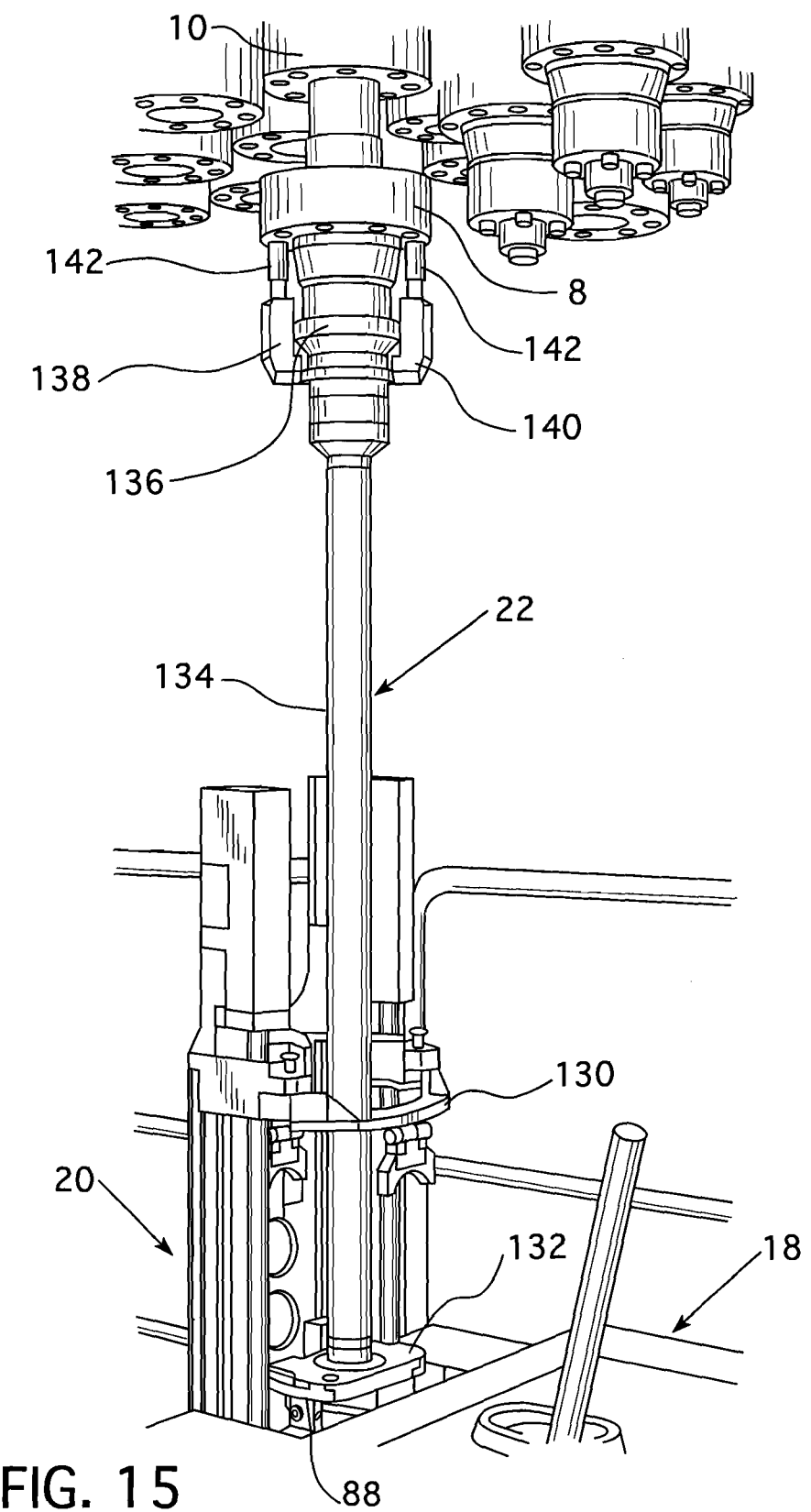

Component exchange system 6 includes four main components, three of which are shown in FIG. 1 and the fourth of which is shown in FIG. 15. In particular, as shown in FIG. 1, component exchange system 6 includes guide cart 16, transition cart 18, and riser apparatus 20. In addition, component exchange system 6 further includes extension column 22 (FIG. 15). A detailed description of the structure, function and operation of each of these individual components of component exchange system 6 is provided hereinbelow. However, before describing each of these individual components in detail, a brief description of the overall operation of the component exchange system 6 will be provided.

Referring to FIG. 1, transition cart 18 is supported by and movable along top rails 12 of carousel 4. As described in greater detail herein, transition cart 18 includes a transition drive mechanism which by linear action is able to selectively rotate a cradle mechanism that is pivotably mounted as part of transition cart 18. In addition, both guide cart 16 and riser apparatus 20 are supported by and movable along bottom rails 14 of carousel 4. Riser apparatus 20 is structured to hold and carry CRDM 8. Riser apparatus 20 carrying a CRDM 8 to be installed in a CRDM guide tube 10 of the reactor vessel is delivered to an appropriate location in under vessel area 2 by guide cart 16. More specifically, riser apparatus 20 carrying CRDM 8 is coupled to guide cart 16 and guide cart 16 moves riser apparatus 20 into place along bottom rails 14. A receiving portion of riser apparatus 20 is structured to be securely engaged with the cradle mechanism of transition cart 18, thereby locking riser apparatus 20 to transition cart 18 in a manner that allows riser apparatus 20 to be rotated relative to transition cart 18 from a horizontal position to a vertical position (shown in FIG. 1).

Furthermore, riser apparatus 20 includes two separate drive mechanisms. The first drive mechanism of riser apparatus 20 is able to move CRDM 8 within riser apparatus 20 along the longitudinal axis thereof of in order to selectively raise and lower CRDM 8. The second drive mechanism of riser apparatus 20 is operable to move the portion of riser apparatus 20 that is structured to hold CRDM 8 relative to transition cart 18 in a direction parallel to the longitudinal axis of riser apparatus 20. As a result, the portion of riser apparatus 20 that is structured to hold CRDM 8 can be moved relative to transition cart 18 so that the position of the center of gravity of riser apparatus 20 can be selectively adjusted while rotating riser apparatus 20 from a horizontal position to a vertical position as just described. In addition, once riser apparatus 20 is in the vertical position, the second drive mechanism can, if necessary, be used to raise and lower riser apparatus 20 over obstacles located in the sub-pile area below carousel 4. When in position below the appropriate CRDM guide tube 10, the first drive mechanism of riser apparatus 20 is used to raise CRDM 8 into the CRDM guide tube 10. In particular, in the exemplary embodiment, CRDM 8 is first moved by the first drive mechanism to a position below the CRDM guide tube 10 at the top of riser apparatus 20. The CRDM 8 is then held in that position while the first drive mechanism is lowered and extension column 22 is installed in riser apparatus 20. The first drive mechanism is then used to raise extension column 22 and thus raise CRDM 8 into CRDM guide tube 10. If more upward travel is needed, the second drive mechanism can be used to raise riser apparatus 20 as described above. In order to remove a CRDM 8 from a CRDM guide tube 10 using component exchange system 6, the steps just described are reversed.

Having just described the overall operation of component exchange system 6 generally, each of the main components of component exchange system 6, namely guide cart 16, transition cart 18, riser apparatus 20, and extension column 22, will now be described in detail in connection with FIGS. 2-17.

Figure 2:
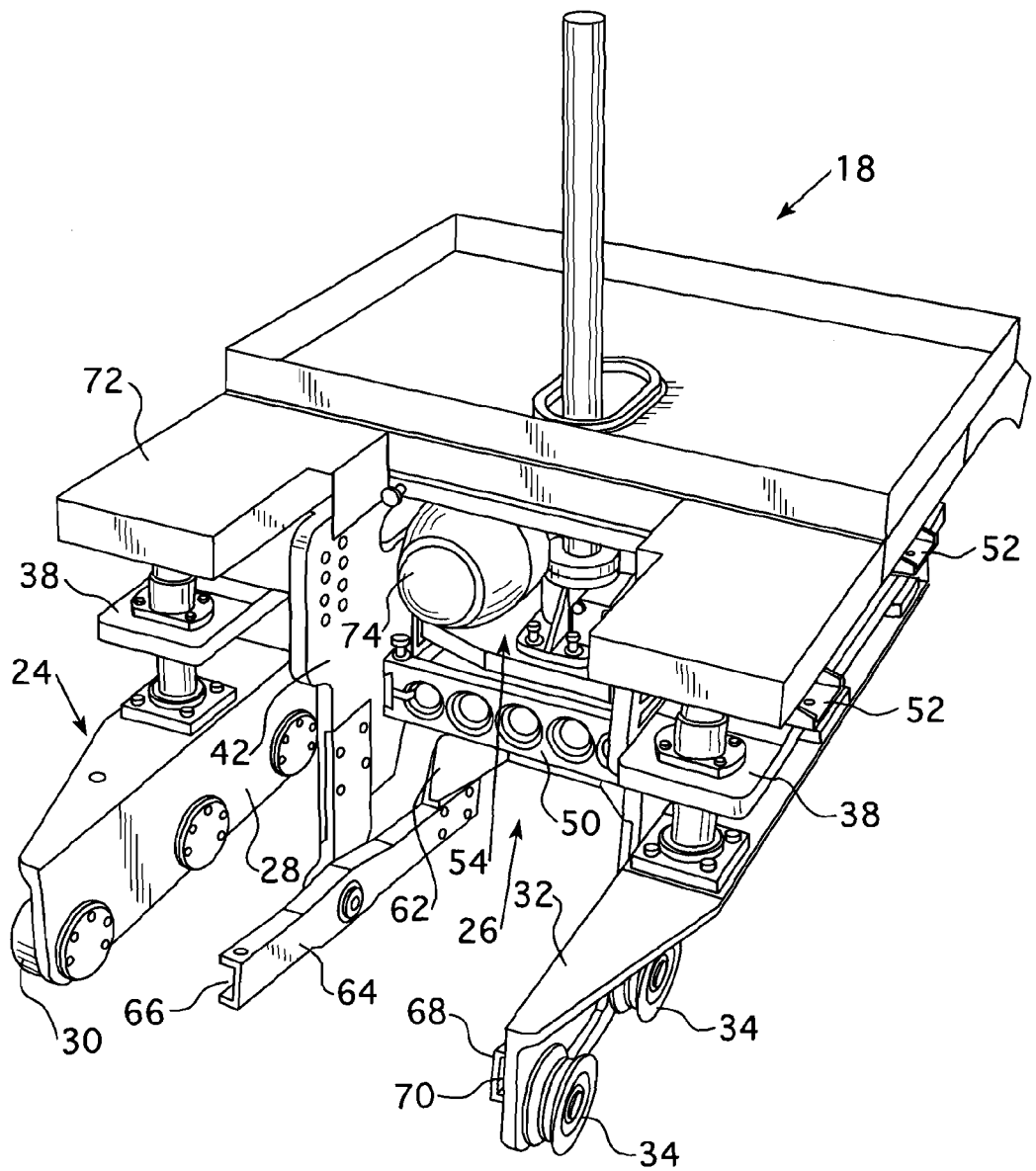
FIG. 2 is a front isometric view of an exemplary embodiment of a transition cart of the component exchange system of FIG. 1.
Figure 3:
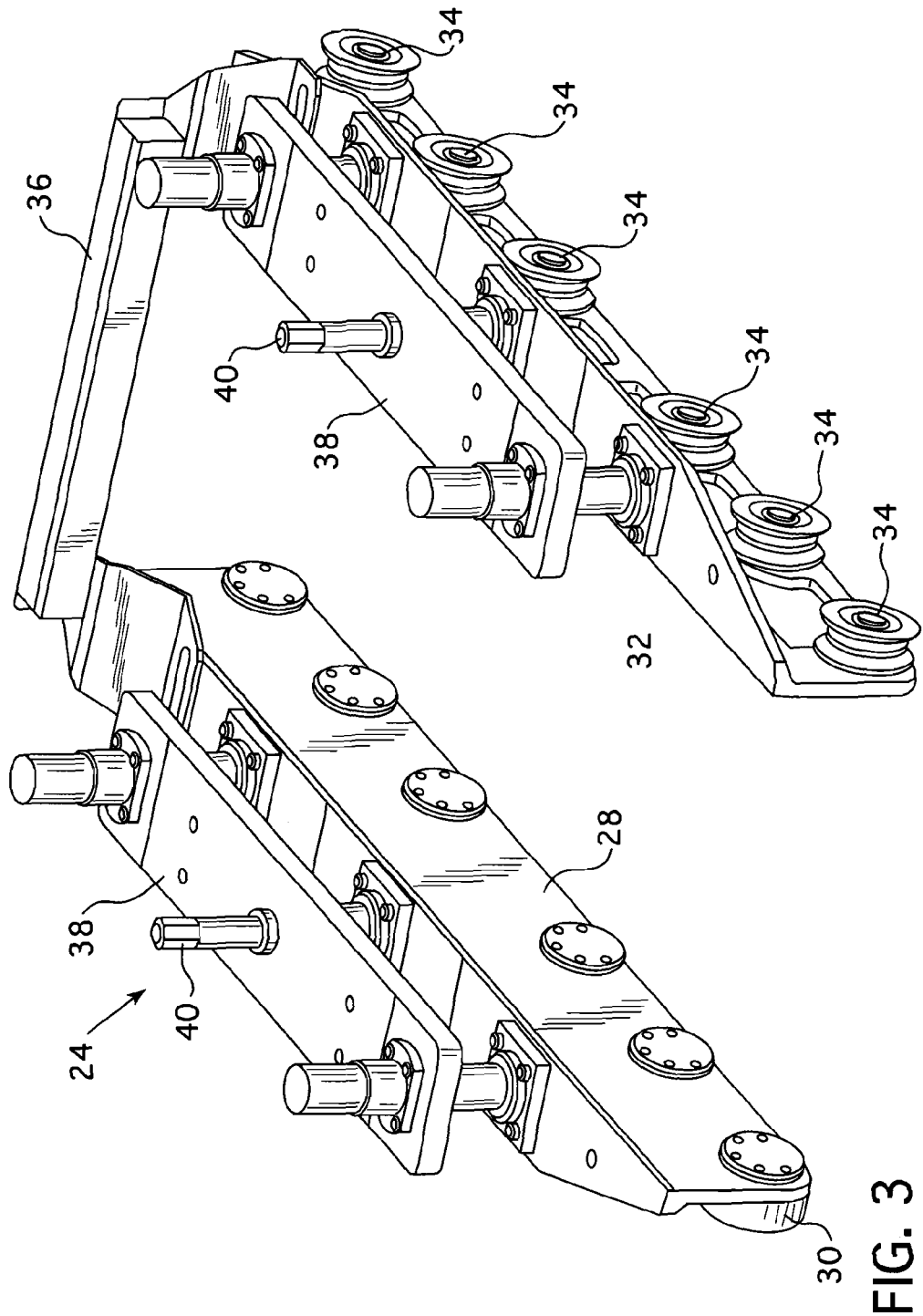
FIG. 3 is a front isometric view of an exemplary embodiment of a cart assembly forming a part of the transition cart of FIG. 2.
Figure 4:
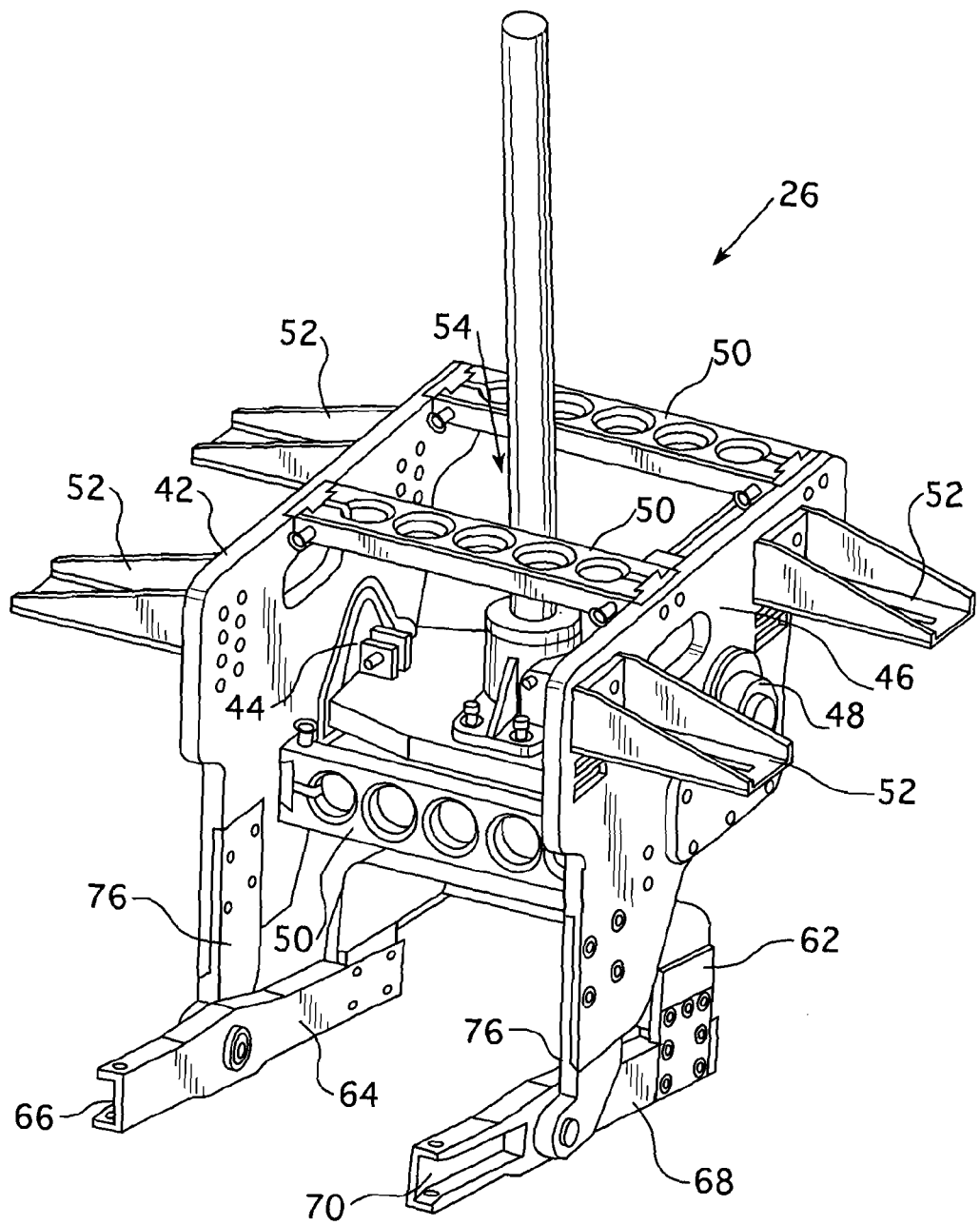
FIG. 4 is a front isometric view of an exemplary embodiment of a transition assembly forming a part of the transition cart of FIG. 2.
Figure 5:
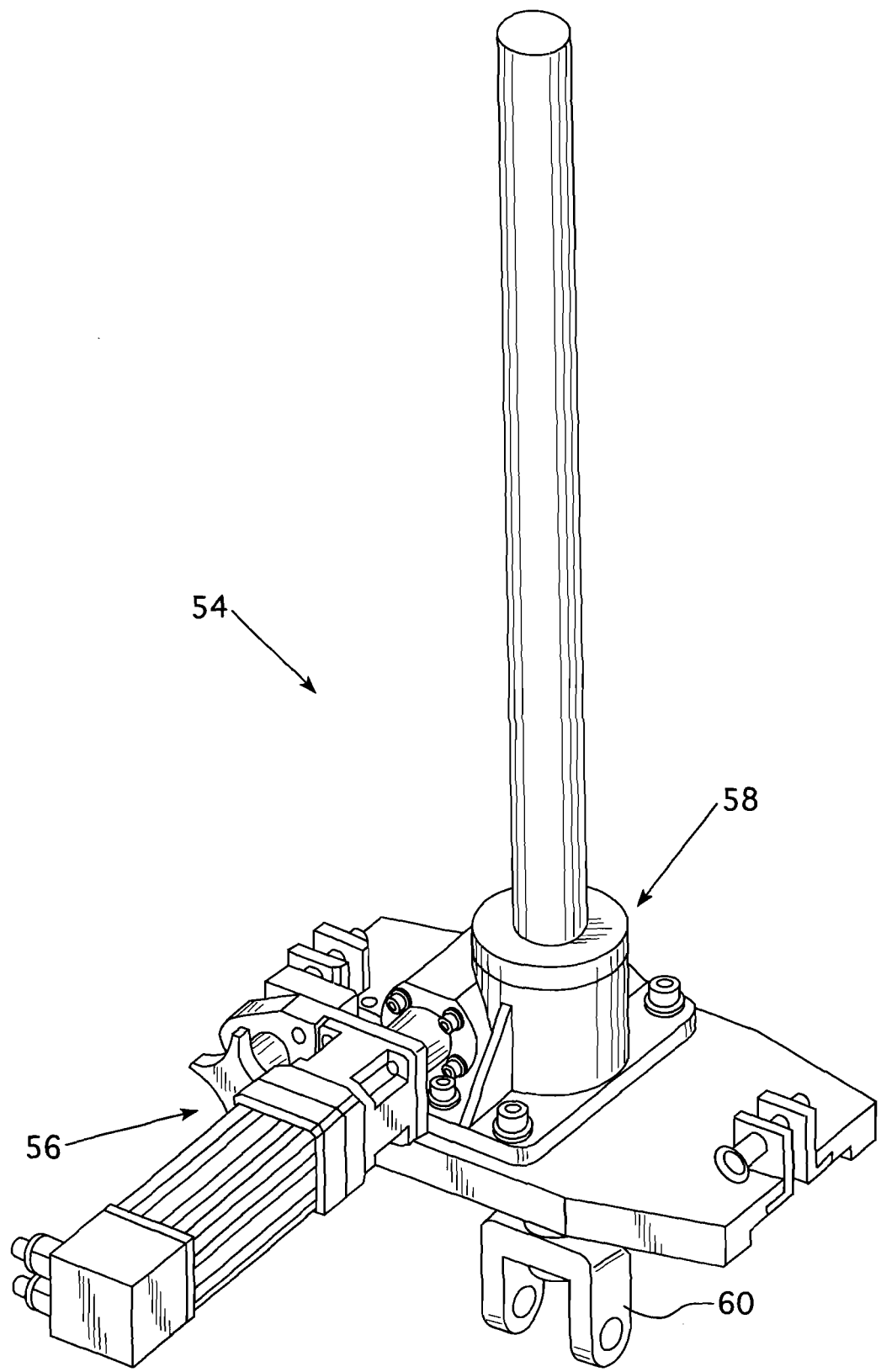
FIG. 5 is a front isometric view of an exemplary embodiment of a transition drive assembly forming a part of the transition cart of FIG. 2

FIG. 2 is a front isometric view of transition cart 18 according to an exemplary embodiment of the invention. Transition cart 18 includes two main components: cart assembly 24 (FIG. 3) and transition assembly 26 (FIG. 4). As seen in FIG. 3, cart assembly 24 includes first wheel assembly 28 supporting a number of flat wheels 30 (structured for movement on a flat top rail 12) and second wheel assembly 32 supporting a number of grooved wheels 34 (structured for movement on an angled top rail 12). First wheel assembly 28 and second wheel assembly 32 are coupled to one another by cross brace 36. First wheel assembly 28 and second wheel assembly 32 each include adjustment plate 38 and transition assembly lifting lead screw 40.

Referring to FIG. 4, transition assembly 26 includes first side plate assembly 42 supporting first swing arm housing member 44 and second side plate assembly 46 supporting second swing arm housing member 48. First side plate assembly 42 and second side plate assembly 46 are coupled to one another and stabilized by tie plates 50. Mounting arms 52 are attached to first side plate assembly 42 and second side plate assembly 46. Mounting arms 52 rest on adjustment plates 38 and hold transition assembly 26 in place by bolts, thus allowing the height of transition assembly 26 to be adjusted to the proper height to receive riser apparatus 20. Each mounting arm 52 has a slot to receives two bolts per mounting arm 52. The slots also allow for the side to side positioning of the transition assembly 26 in order to be able to center it to receive the riser apparatus 20. Transition assembly 26 further includes transition drive assembly 54 (FIG. 5) which is mounted to and supported by first swing arm housing member 44 and second swing arm housing member 48. Transition drive assembly 54 comprises motor 56 that is coupled to and provides a rotational input to jack screw assembly 58. Mounting bracket 60 is coupled to jack screw assembly 58. Transition assembly 26 also includes drive interface 62 that is coupled to mounting bracket 60 by a quick pin. First pivot arm 64 including receiving slot 66 is coupled at a first end thereof to drive interface 62 and is pivotably mounted at a midpoint thereof to bracket 76 attached to first side plate assembly 42. Similarly, second pivot arm 68 including receiving slot 70 is coupled at a first end thereof to drive interface 62 and is pivotably mounted at a midpoint thereof to bracket 76 attached to second side plate assembly 46. As a result, transition drive assembly 54, when driven by motor 56 and jack screw assembly 58, is able to cause first and second pivot arms 64, 68 to be rotated about the axes on which they are coupled to the first side plate assembly 42 and second side plate assembly 46, respectively.

Referring again to FIG. 2, transition assembly 26 also includes cover 72 and camera 74. Camera 74 enables a remote operator to observe the operation of riser apparatus 20 as described in detail herein.

Figure 6:
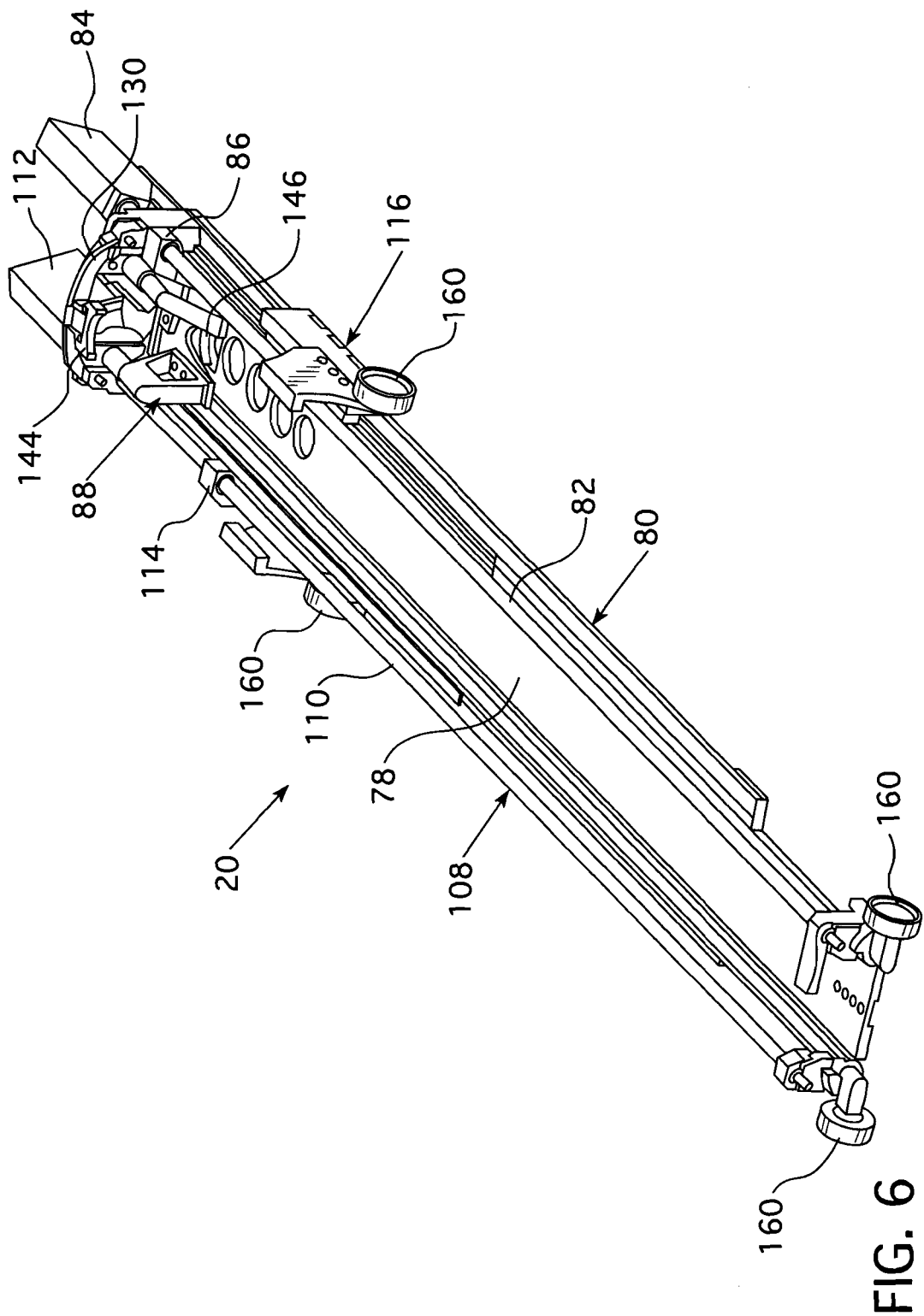
FIG. 6 is a front isometric view and FIG. 7 is an exploded view of an exemplary embodiment of a riser apparatus of the component exchange system of FIG. 1.
Figure 7:
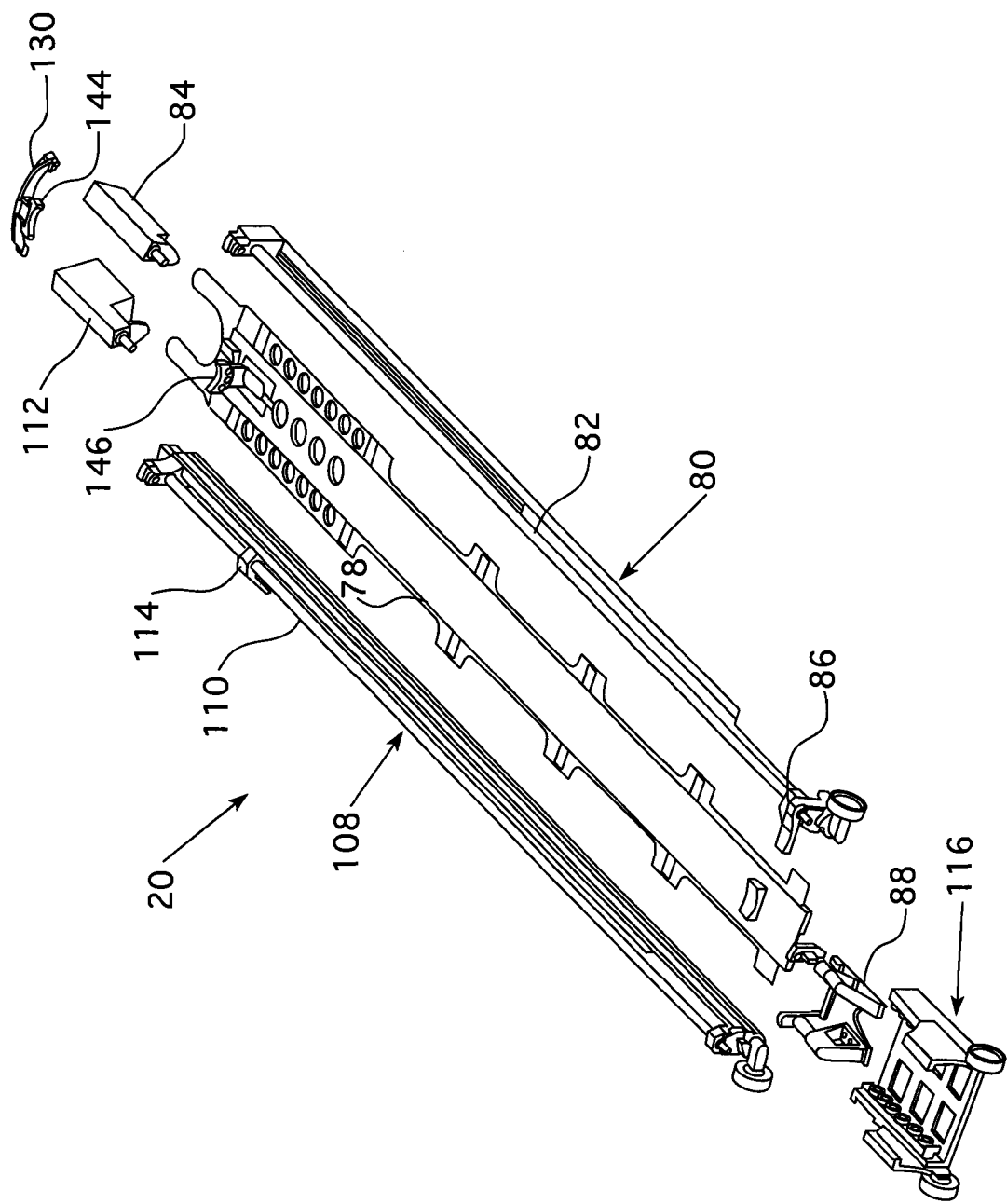

FIG. 6 is a front isometric view and FIG. 7 is an exploded view of riser apparatus 20 according to an exemplary embodiment of the invention. Riser apparatus 20 includes base plate 78 which functions as the main structural support member for riser apparatus 20. First rail assembly 80 is coupled to a first side of base plate 78. First rail assembly 80 includes lead screw 82 which is driven by first motor 84 coupled to the top end of first rail assembly 80. In the exemplary embodiment, lead screw 82 is a one inch diameter by five revolution per inch lead screw, and first motor 84 is a brushless DC motor. Alternatively, lead screw 82 can be driven by an air motor, an air wrench, a battery powered drill, or by hand manually. Also in the exemplary embodiment, first motor 84 drives lead screw 82 through a 7:1 gear box. First rail assembly 80 also includes coupler 86 (in the form of a lead screw nut housing) that is operatively coupled to lead screw 82 in a manner wherein coupler 86 will move up and down lead screw 82 when lead screw 82 is driven (rotated) by first motor 84.

Figure 8:
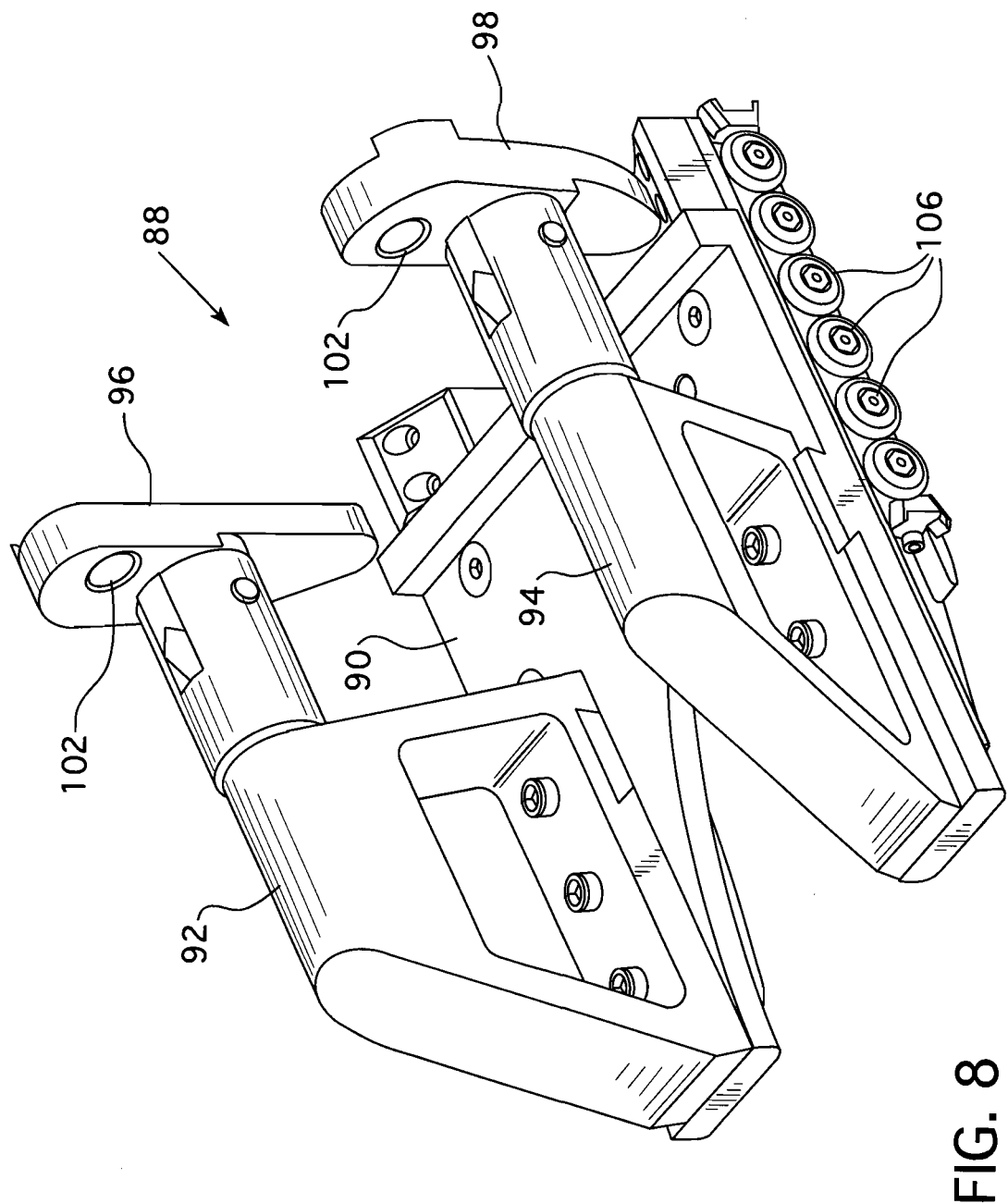
FIG. 8 is an isometric view of a lift assembly forming a part of the riser apparatus of FIGS. 6 and 7.
Figure 9:
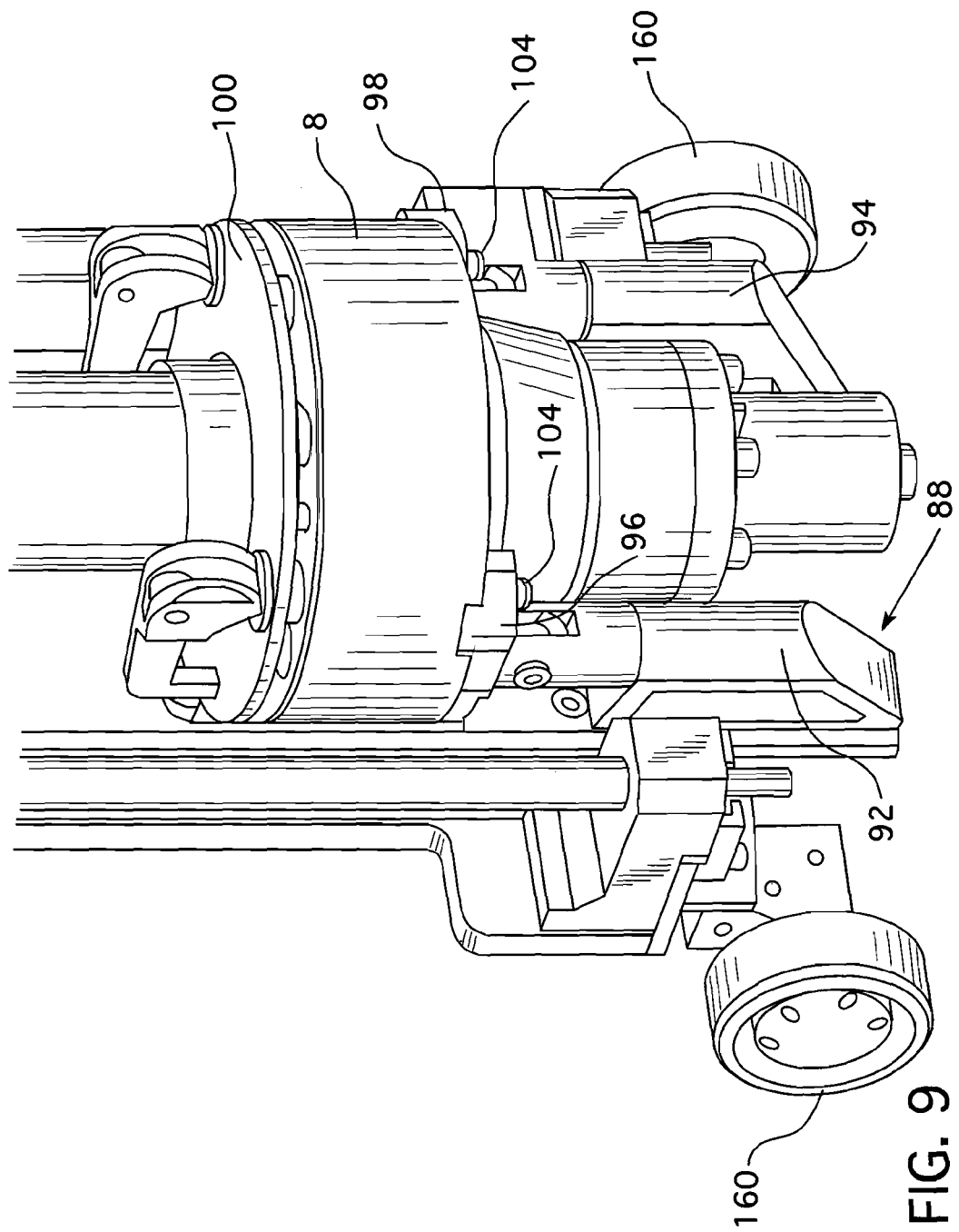
FIG. 9 is an isometric view of the bottom end of the riser apparatus of FIGS. 6 and 7 showing a CRDM being held thereby.

Riser apparatus 20 further includes lift assembly 88 that is structured to hold, support and lift/lower a CRDM 8 provided in riser apparatus 20. More specifically, coupler 86 is attached to lift assembly 88 such that when coupler 86 is caused to be moved up and down as just described, lift assembly 88, and a CRDM 8 being held thereby, will also be moved up and down lead screw 82. As seen in FIG. 8, which is an isometric view of lift assembly 88, lift assembly 88 includes base 90 and first and second support arms 92, 94 coupled to base 90. Each support arm 92, 94 has coupled thereto a respective support 96, 98 structured to receive and hold the bottom, cylindrical end of a CRDM 8 as shown in FIG. 9. As seen in FIG. 9, in the exemplary embodiment, cover flange lock 100 is used to secure CRDM 8 to lift assembly 88 (the lock mechanisms 104 of cover flange lock 100 are received through holes 102 provided in each support 96, 98). Wheels 106 are provided on either side of base 90 to facilitate movement of lift assembly 88 along first rail assembly 80 and second rail assembly 108 described below.

Second rail assembly 108 is coupled to a second side of base plate 78. Second rail assembly 108 includes lead screw 110 which is driven by second motor 112 coupled to the top end of rail assembly 108. In the exemplary embodiment, lead screw 110 is a one inch diameter by five revolution per inch lead screw, and second motor 112 is a brushless DC motor. Also in the exemplary embodiment, second motor 112 drives lead screw 110 through a 10:1 gear box. Second rail assembly 108 also includes coupler 114 (in the form of a lead screw nut housing) that is operatively coupled to lead screw 110 in a manner wherein coupler 114 will move up and down lead screw 110 when lead screw 110 is driven (rotated) by second motor 112.

Figure 10:
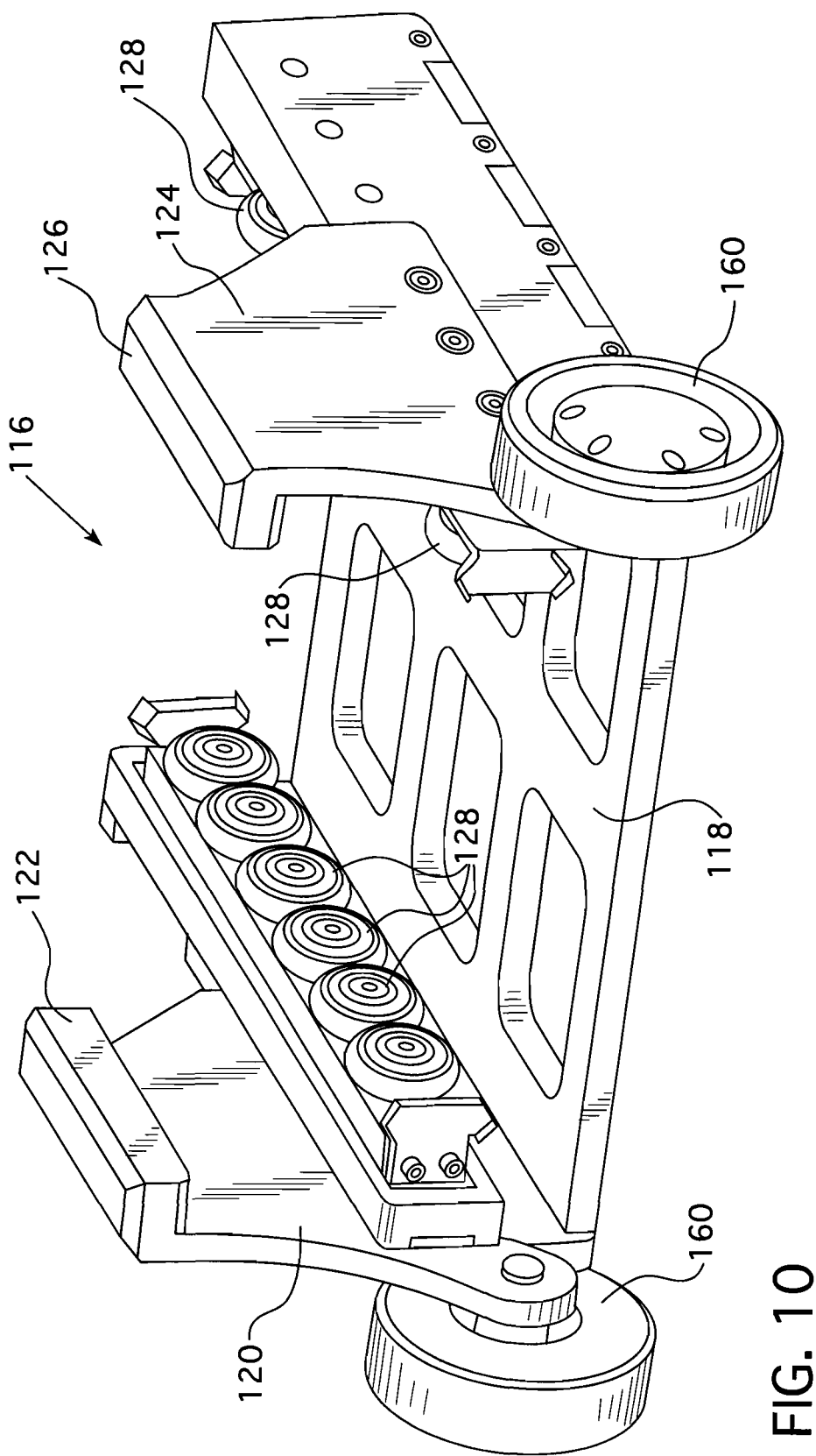
FIG. 10 is an isometric view of a riser trolley forming a part of the riser apparatus of FIGS. 6 and 7.
Figure 11:
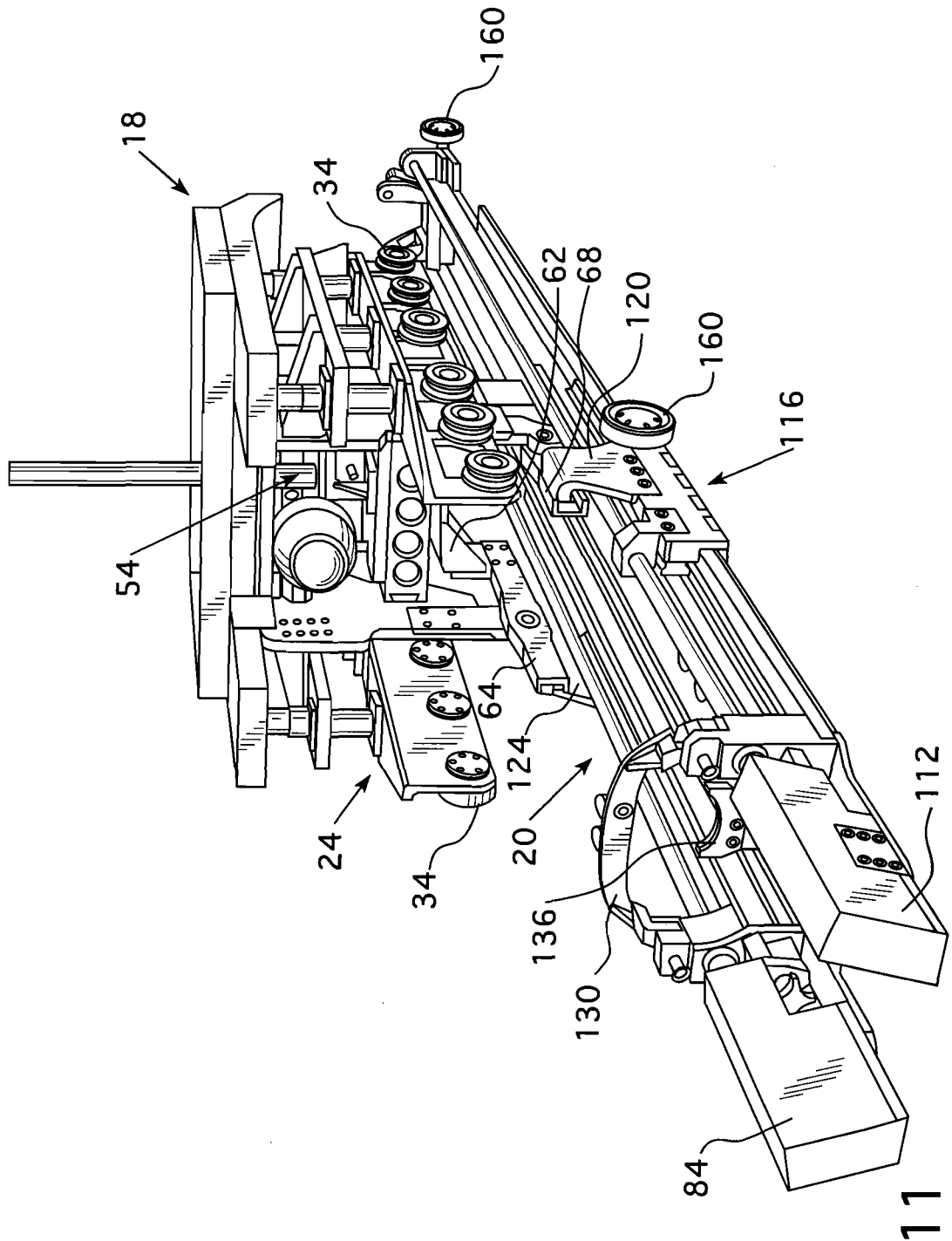
FIG. 11 is an isometric view showing the riser apparatus coupled to the transition cart.
Figure 12:
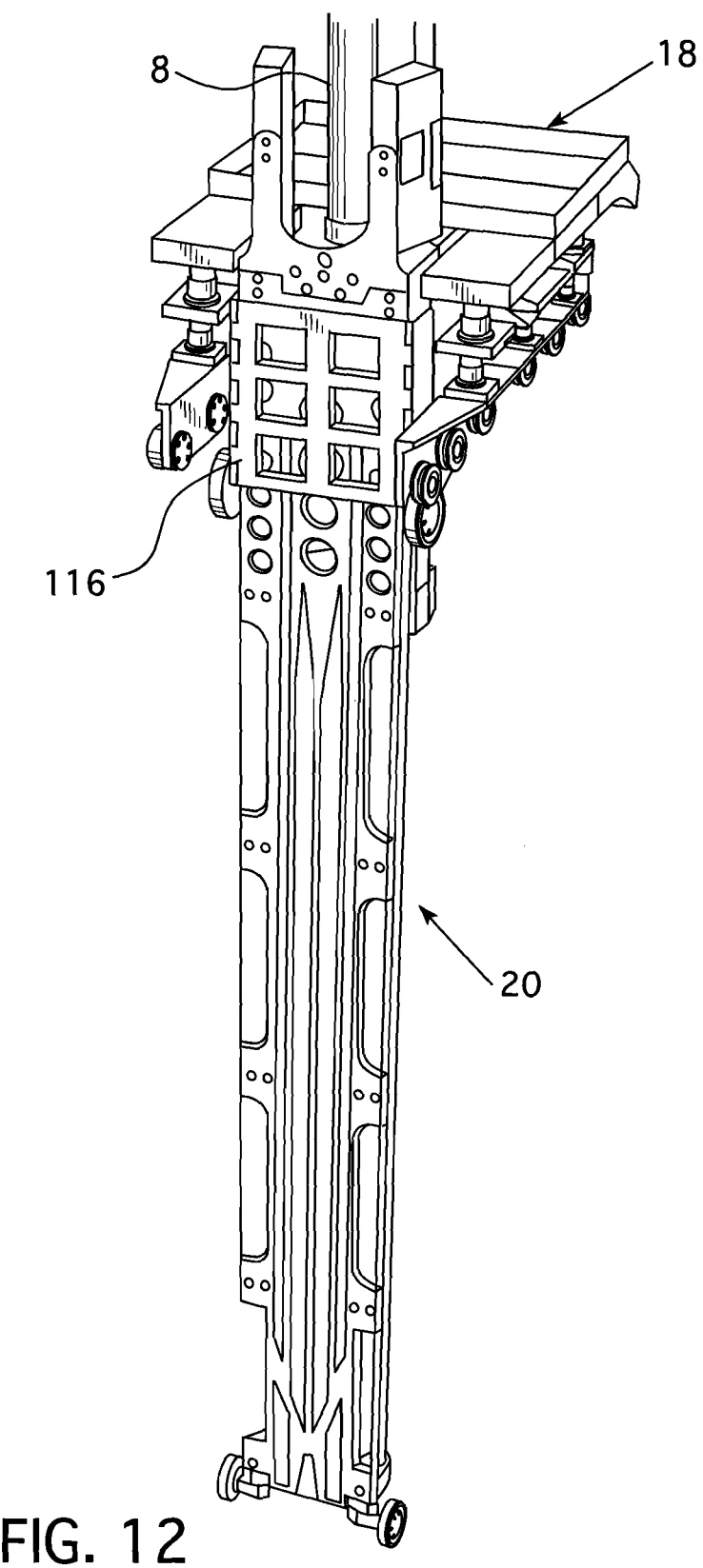
FIG. 12 is a side view showing rotation of the riser apparatus by the transition cart.

Riser apparatus 20 further includes riser trolley 116. Coupler 114 is attached to riser trolley 116 such that when coupler 114 is caused to be moved up and down as just described, riser trolley 116 will also be moved up and down lead screw 112. As seen in FIG. 10, which is an isometric view of riser trolley 116, riser trolley 116 includes base 118 and side plates 120, 124 each having a respective flange 122, 126. Flanges 122, 126 are structured to be received and securely held in receiving slots 66, 70 of first and second pivot arms 64, 68 of transition cart 18 in order to securely couple riser apparatus 20 to transition cart 18 so that transition cart 18 can rotate (by way of transition drive assembly 54) riser apparatus 20 between the horizontal and vertical positions during installation and removal of a CRDM 8 as described elsewhere herein. FIG. 11 is an isometric view showing riser apparatus 20 coupled to transition cart 18 in the horizontal position as just described, and FIG. 12 is an isometric view showing riser apparatus 20 after it has been rotated into the vertical position by transition cart 18 as just described (for ease of illustration, carousel 4 is not shown in FIGS. 11 and 12). Wheels 128 are provided on either side of base 118 to facilitate movement of riser trolley 116 along first and second rail assemblies 80, 108.

Figure 13:
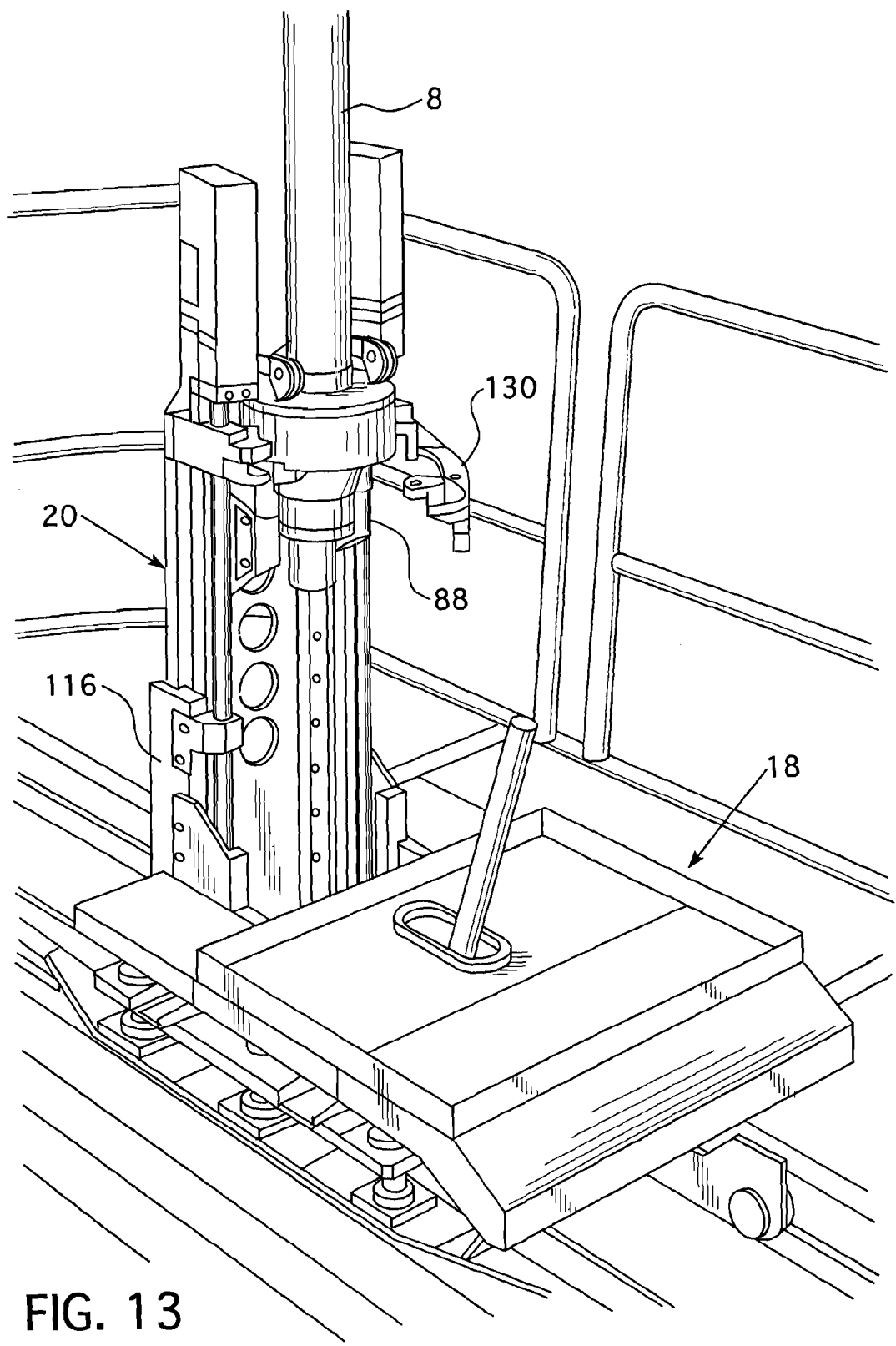
FIGS. 13-15 are schematic diagrams illustrating the transfer of a CRDM to the transfer bar of the riser apparatus of the component exchange system of the present invention and the subsequent raising of the CRDM using the extension member of the component exchange system of the present invention.
Figure 14:
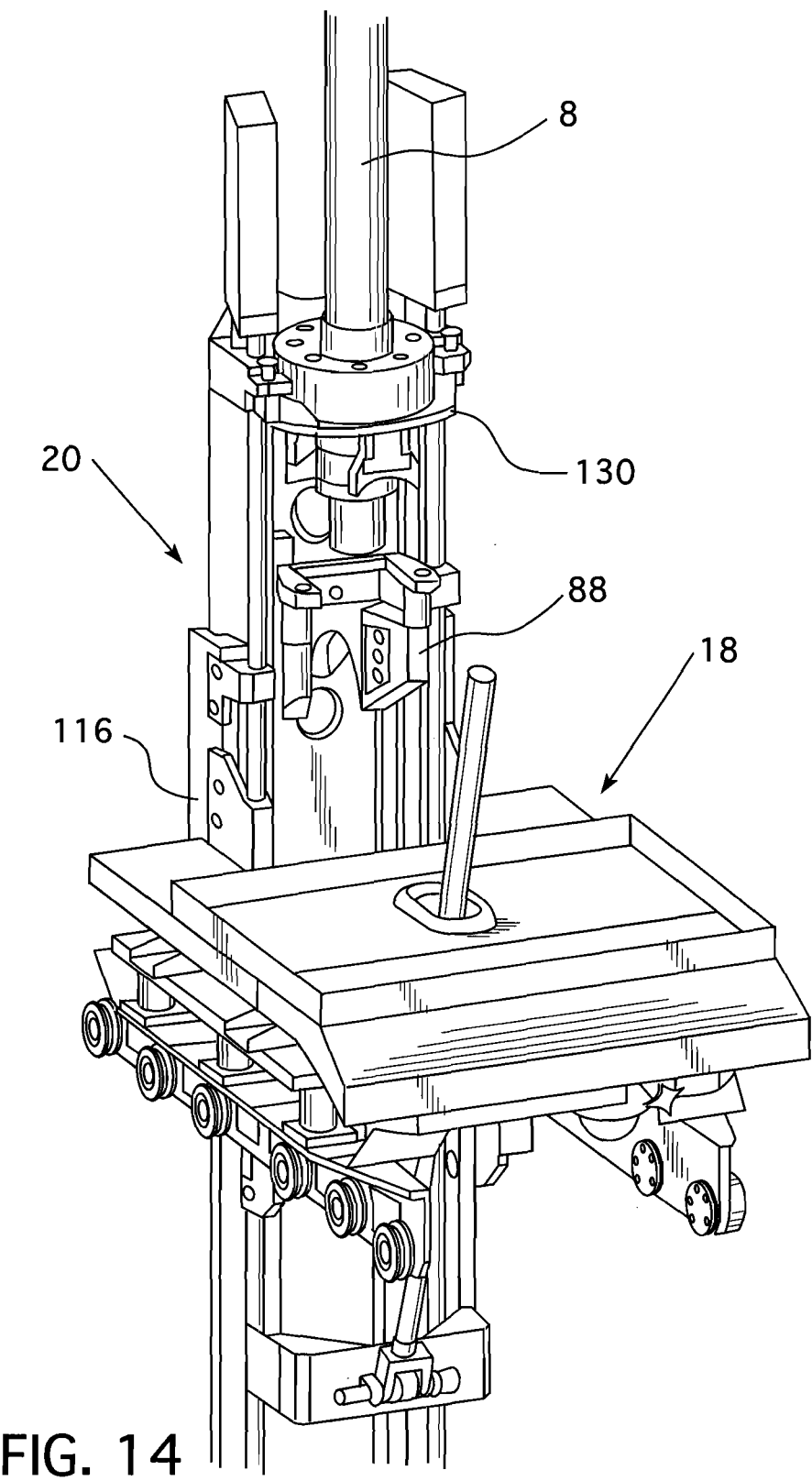

Referring again to FIGS. 6 and 7, riser apparatus 20 further includes transfer bar 130 pivotably attached to the top ends of the first and second rail assemblies 80, 108. The function of transfer bar 130 is to hold and support CRDM 8 after it has been raised to the top of riser apparatus 20 by lift assembly 88 so that lift assembly 88 can then be lowered to accept extension column 22. This process is illustrated in FIGS. 13-15. As seen in FIG. 15, extension column 22 includes base plate 132, main column 134, and support bucket 136. Support bucket 136 is rotatably attached to main column 134. Base 132 is structured to be received and held by lift assembly 88 so that extension column can be raised and lowered by lift assembly 88. Support bucket 136 is structured to receive and support the bottom end of CRDM 8. By further lifting extension column 22 using lift assembly 88 (driven as described elsewhere herein), CRDM 8 can be lifted the rest of the way into the associated CRDM guide tube 10 so that a flange to flange mating between CRDM 8 and CRDM guide tube 10 can be made. Extension column 22 may then be lowered and removed and riser apparatus 20 can be rotated back to the horizontal position and detached from transition cart 18. In addition, in the exemplary embodiment, extension member 22 further includes first and second bolt support members 138, 140 rotatably attached to support bucket 136. In the illustrated, non-limiting embodiment, first and second bolt support members 138, 140 are positioned on opposite sides of support bucket 136. Bolt support members 138, 140 are structured to hold the first two bolts 142 (and washers) that are to be inserted into the flanges of CRDM 8 and CRDM guide tube 10, which is a great convenience to the worker(s) installing CRDM 8. There are also spherical rod bearings provided on each end of main column 134 attaching to base plate 132 and support bucket 136 which compensates for any misalignment between the riser apparatus 20 and the CRDM tube flange.

As seen FIGS. 6 and 7, riser apparatus 20 in the exemplary embodiment also includes upper and lower stabilizer bars 144, 146. Upper and lower stabilizer bars 144, 146 keep CRDM 8 centered before it is actually inserted into CRDM guide tube 10.

Figure 16:
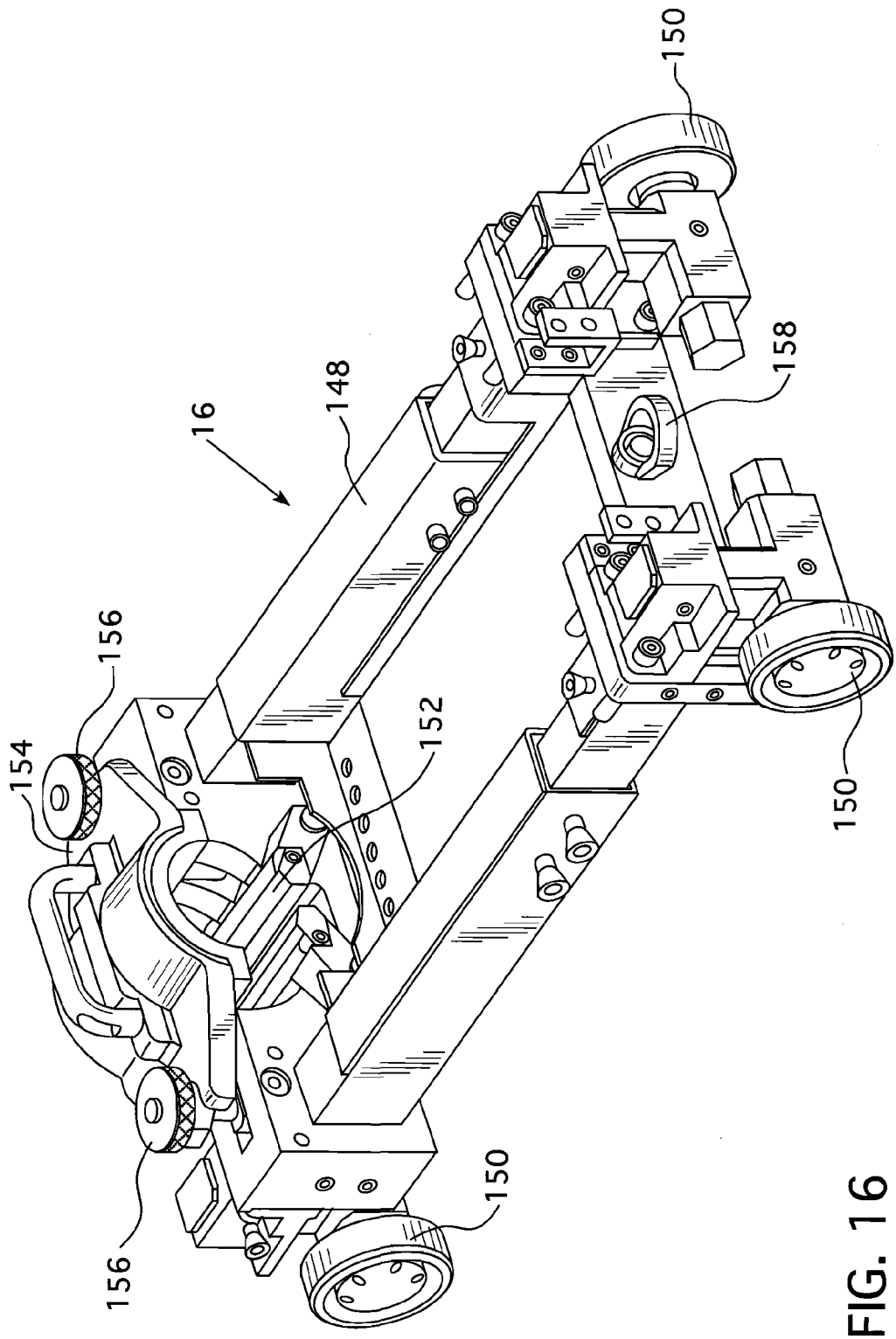
FIG. 16 is an isometric view of an exemplary embodiment of a guide cart of the component exchange system of FIG. 1.
Figure 17:
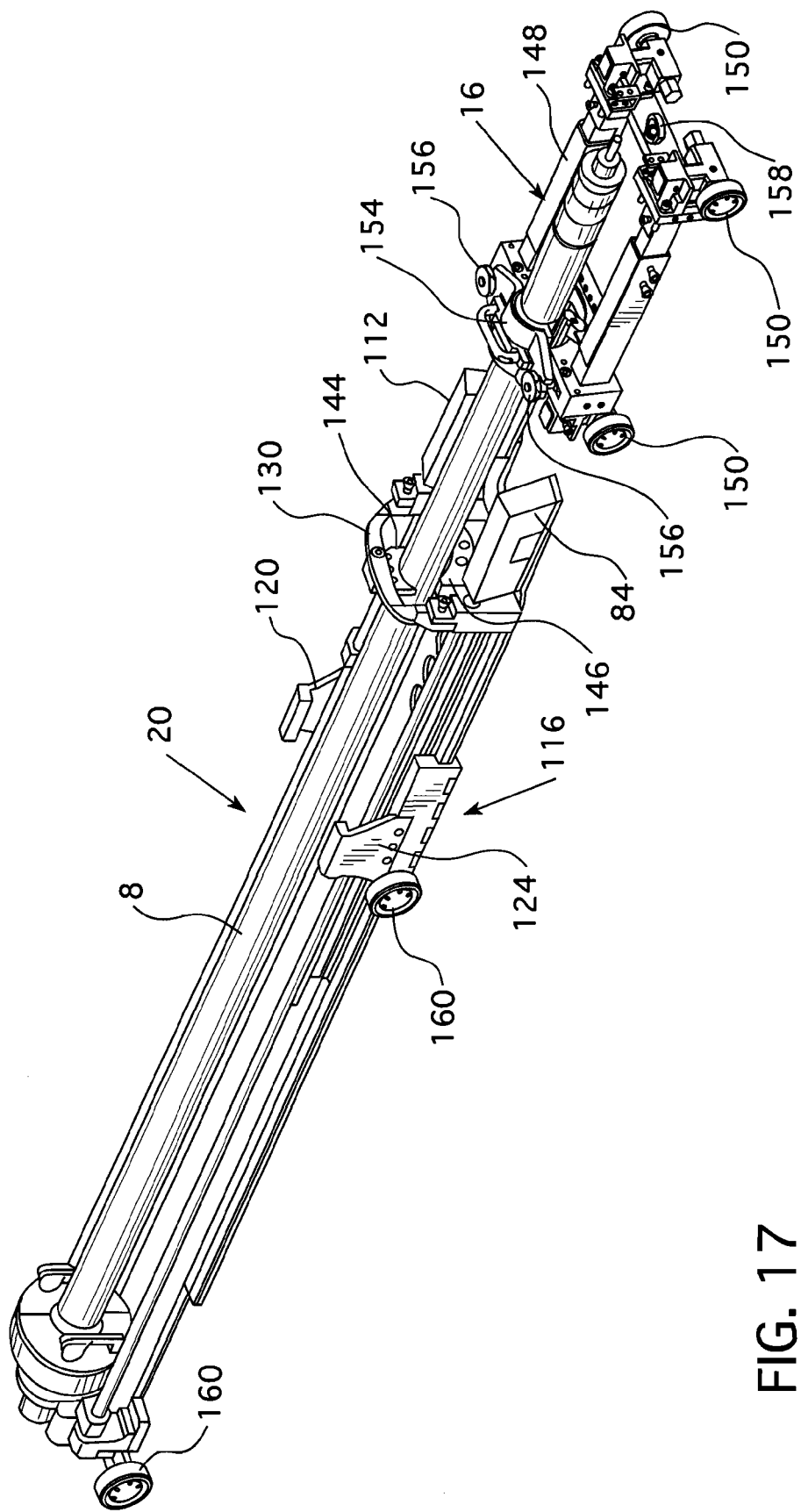
FIG. 17 is an isometric view showing the riser apparatus of FIGS. 6 and 7 carrying a CRDM coupled to the guide cart of FIG. 16.

Finally, as noted above, riser apparatus 20 carrying a CRDM 8 to be installed in a CRDM guide tube 10 of the reactor vessel is delivered to an appropriate location in under vessel area 2 by guide cart 16. FIG. 16 is an isometric view of guide cart 16, and FIG. 17 is an isometric view showing riser apparatus 20 carrying a CRDM 8 coupled to guide cart 16. Guide cart 16 includes frame 148 having wheels 150 attached thereto that are structured to allow guide cart 16 to be moved along bottom rails 14 of carousel 4 as described below. In addition, riser apparatus 20 includes wheels 160 that are structured to allow riser apparatus 20 to be moved along bottom rails 14 of carousel 4 as described below. The front end of frame 148 includes CRDM support area 152 that is structured to receive and hold the top end of a CRDM 8 (FIG. 17). CRDM locking mechanism 154 is structured to fit over CRDM 8 and be removeably secured to frame 148 by bolts 156 in order to secure the CRDM 8 to guide cart 16. The rear end of frame 148 includes circular hitch 158 that enables a winch driven cable (not shown) to be attached to guide cart 16 in order to move guide cart 16, and riser apparatus 20 holding a CRDM 8 attached to guide cart 16 (as shown in FIG. 17), along bottom rails 14 of carousel 4 so that it can be engaged with transition cart 18 as described elsewhere herein in the exemplary, non-limiting illustrated embodiment.

Figure 18:
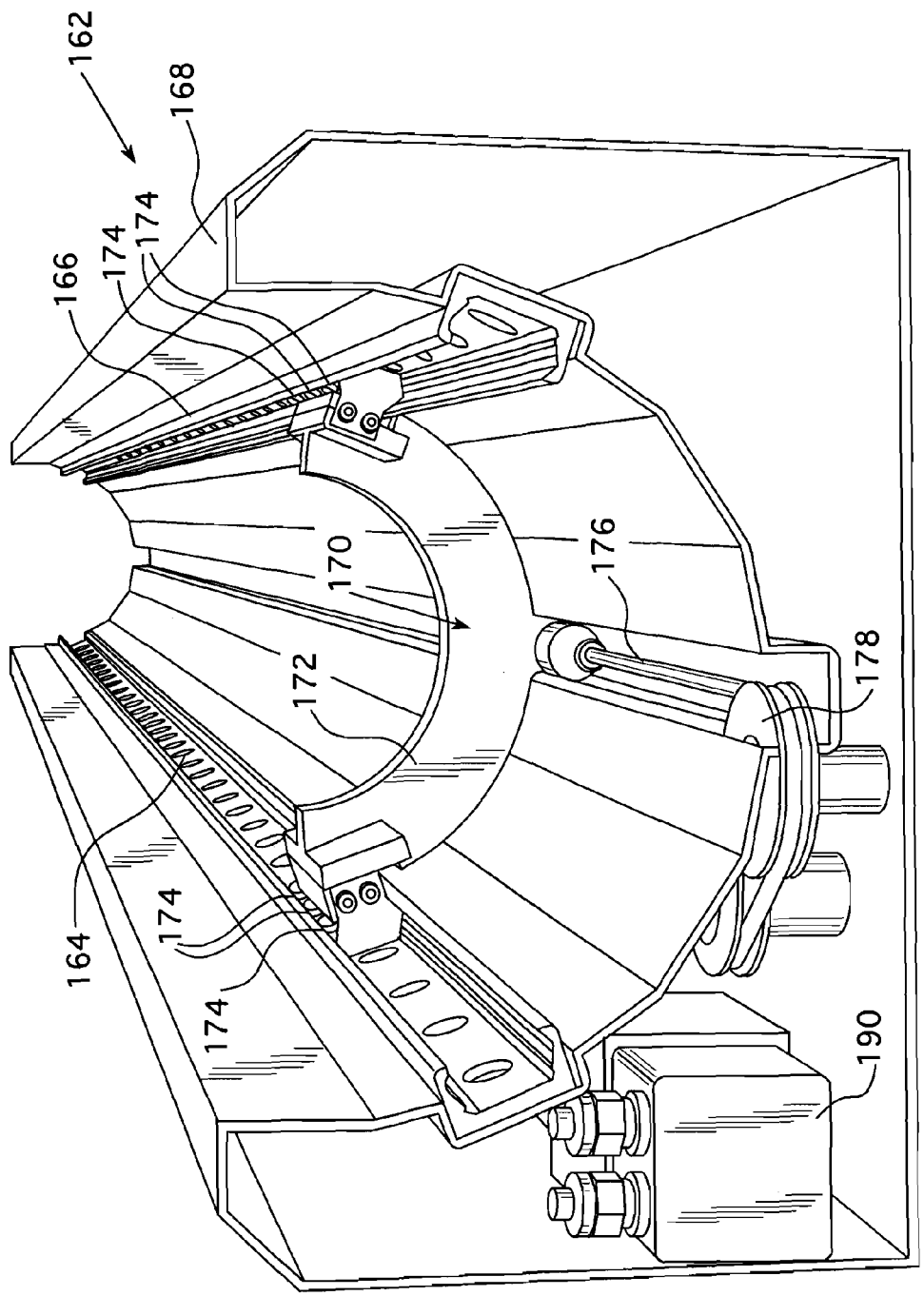
FIGS. 18 and 19 are isometric views of an riser apparatus employing an alternative CRDM lifting mechanism according to an alternative embodiment of the present invention.
Figure 19:
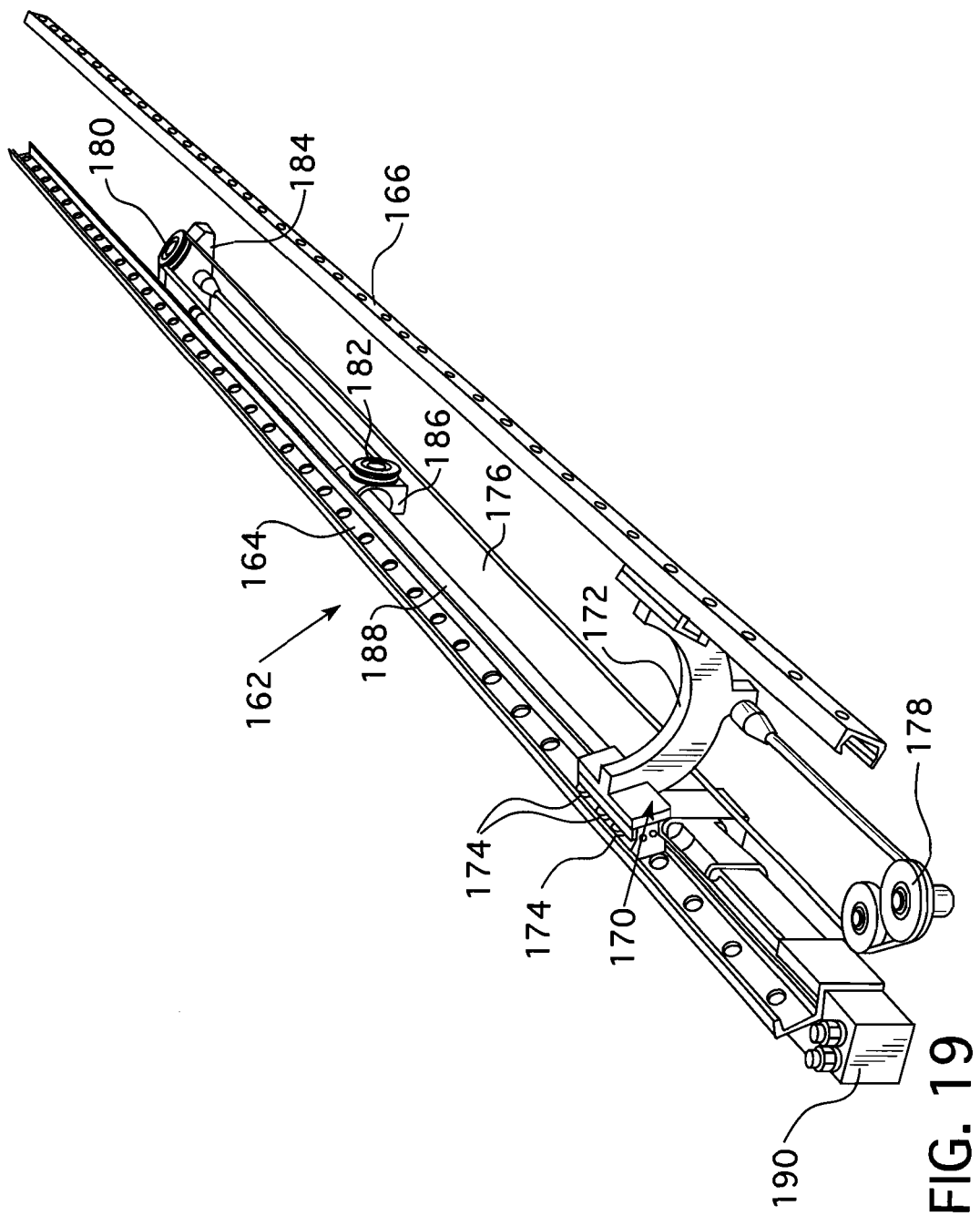

FIGS. 18 and 19 are isometric views of an alternative riser apparatus 162 employing an alternative CRDM lifting mechanism that may, for example, be employed in component exchange system 6 in place of riser apparatus 20 or a portion thereof (e.g., the CRDM lifting portion). Riser apparatus 162 includes rails 164, 166 attached to housing 168. Lift assembly 170 is coupled to rails 164, 166 in a manner that allows lift assembly 170 to move up and down rails 164, 166. Lift assembly 170 includes support 172 structured to hold and support a CRDM 8 having a set of wheels 174 provided on opposite sides thereof. Each set of wheels 174 is structured to be received within and move along a respective rail 164, 166. As seen in FIGS. 18 and 19, riser apparatus 162 includes cable 176 which is used to raise and lower lift assembly 170 along rails 164, 166. In the exemplary embodiment, cable 176 is made from synthetic fiber such as Vectran® fiber. More specifically, cable 176 is attached at one end to a lift assembly 170. Cable 176 is fed thru a series of pulleys 178, 180, 182 to dead end location 184 which anchors cable 176. Pulley 182 is attached to lead screw nut housing 186, which in turn is coupled to lead screw 188 driven by motor 190. As lead screw nut housing 186 is raised and lowered axially along the lead screw 188 as lead screw 188 is turned by motor 190, the lift assembly end of cable 176 is raised and lowered, thereby raising and lowering left assembly 170 and a CRDM 8 it may or may not be holding. Since cable 176 is dead ended after going around pulley 182, the amount of cable movement is double the amount of lead screw nut housing 186 travel. Additional rails (not shown) may be placed on the outside of housing 168 for raising the entire riser apparatus 162 by way of an additional drive assembly (also not shown).

Thus, component exchange system 6 provides a system that simplifies and facilitates the installation, removal and/or replacement of CRDMs or other components in nuclear reactor vessels such as BWRs. In particular, by including dual drive riser apparatus 20 that can selectively raise and lower either or both of the CRDM and the riser apparatus 20 (or riser apparatus 162), and transition cart 18 that can selectively rotate riser apparatus 20, component exchange system 6 provides the flexibility to accommodate for different power plant designs and configurations.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the breath of the appended claims and any and all equivalents thereof.

What is claimed is:

1. A system for installing or removing a component of a nuclear reactor, comprising:
a riser apparatus, the riser apparatus having a lift assembly structured to hold and support the component and a first drive assembly coupled to the lift assembly and structured to selectively move the lift assembly and the component along a length of the riser apparatus; and
a transition cart movable along an under vessel area of the nuclear reactor in a first direction and having a pivot mechanism, wherein the riser apparatus is moveable along the under vessel area separate from and relative to the transition cart along the first direction and is selectively engageable with and disengageable from the pivot mechanism, and wherein the pivot mechanism is structured to selectively rotate the riser apparatus from a horizontal position to a vertical position when the riser apparatus is engaged with the pivot mechanism.

2. The system according to claim 1, wherein the riser apparatus includes a second drive assembly structured to selectively move the riser apparatus relative to the transition cart in a direction parallel to a longitudinal axis of the riser apparatus.

3. The system according to claim 2, wherein the riser apparatus includes a riser trolley selectively engageable with the pivot mechanism, wherein the second drive assembly includes a lead screw, a motor operatively coupled to the lead screw for rotating the lead screw, and a coupling device coupled to the lead screw and the riser trolley, wherein rotation of the lead screw by the motor causes the riser apparatus to move relative to the transition cart in the direction parallel to the longitudinal axis of the riser apparatus.

4. The system according to claim 3, wherein the riser apparatus includes a first rail assembly and a second rail assembly, and wherein the riser trolley includes a first one or more wheels and a second one or more wheels, wherein the first rail assembly moves relative to the first one or more wheels and the second rail assembly moves relative to the second one or more wheels when the riser apparatus is caused to move relative to the transition cart.

5. The system according to claim 4, wherein the pivot mechanism includes a transition drive assembly operatively coupled to a first pivot arm and a second pivot arm, wherein the riser trolley includes a first flange structured to engage and be securely held by the first pivot arm and a second flange structured to engage and be securely held by the second pivot arm, and wherein the transition drive assembly is structured to selectively rotate the first and second pivot arms.

6. The system according to claim 1, wherein the pivot mechanism includes a transition drive assembly operatively coupled to one or more pivot arms, wherein the one or more pivot arms are structured to engage one or more portions of the riser apparatus, and wherein the transition drive assembly is structured to selectively rotate the one or more pivot arms.

7. The system according to claim 1, wherein the first drive assembly includes a lead screw, a first motor operatively coupled to the lead screw for rotating the lead screw, and a coupling device coupled to the lead screw and the lift assembly, wherein rotation of the lead screw by the first motor causes the coupling device to move along the lead screw and the lift assembly to move along the length of the riser apparatus.

8. The system according to claim 7, wherein the riser apparatus includes a first rail assembly and a second rail assembly, and wherein the lift assembly includes a first one or more wheels structured to move along the first rail assembly and a second one or more wheels structured to move along the second rail assembly.

9. The system according to claim 8, wherein the lift assembly includes a one or more supports structured to receive and hold a portion of the component.

10. The system according to claim 1, wherein the under vessel area includes a rail system having first top rail and a second top rail, wherein the transition cart includes a first one or more wheels structured to move along the first top rail and a second one or more wheels structured to move along the second top rail.

11. The system according to claim 10, wherein the rail system includes a first bottom rail and a second bottom rail, wherein the riser apparatus includes a third one or more wheels structured to move along the first bottom rail and a second one or more wheels structured to move along the second bottom rail.

12. The system according to claim 11, further comprising a guide cart movable along the first and second bottom rails for moving the riser apparatus along the first and second bottom rails.

13. The system according to claim 12, wherein the guide cart includes a support area structured to engage and hold a portion of the component when the component is held by the riser apparatus.

14. The system according to claim 13, wherein the guide cart includes a hitch for coupling the guide cart to a cable of a winch system structured to move the guide cart along the first and second bottom rails.

15. The system according to claim 1, further comprising an extension column having a first end structured to be held and supported by the lift assembly and a second end structured to hold and support the component, wherein the riser apparatus is structured to selectively move and lift the extension column and the component when the component is held by the extension column.

16. The system according to claim 15, wherein the second end includes a plurality of support members, each support member being structured to hold a bolt used to secure the component in place in the nuclear reactor.

17. The system according to claim 1, wherein the component is a CRDM.

18. The system according to claim 1, wherein the riser apparatus includes a selectively pivotable transfer bar for supporting the component when the component is disengaged from the lift assembly and the lift assembly is lowered.

19. The system according to claim 1, wherein the first drive assembly includes a lead screw, a motor operatively coupled to a first end of the lead screw for rotating the lead screw, a nut housing coupled to the lead screw, a first pulley coupled to the nut housing, and a cable coupled to the first pulley and the lift assembly, wherein rotation of the lead screw by the motor causes the nut housing to move along the lead screw and the lift assembly to move along the length of the riser apparatus.

20. The system according to claim 19, wherein the riser apparatus includes first and second rails, wherein the lift assembly is moveably coupled to the first and second rails, and wherein rotation of the lead screw by the motor causes the nut housing to move along the lead screw and the lift assembly to move along the first and second rails.

21. The system according to claim 20, wherein the cable has a first end attached to the lift assembly and a second end attached to a dead end location at second end of the lead screw opposite the first end, wherein at least one second pulley is provided adjacent the first end of the lead screw and at least one third pulley is provided at the dead end location, and wherein the cable passes from the lift assembly, through the at least one second pulley, then through the at least one third pulley, and then through the first pulley to the dead end location.

22. An apparatus for raising and lowering a component of a nuclear reactor, comprising:
a lift assembly structured to hold and support the component; and
a drive assembly coupled to the lift assembly and structured to selectively move the lift assembly and the component along a length of the apparatus, wherein the drive assembly includes a lead screw, a motor operatively coupled to a first end of the lead screw for rotating the lead screw, a nut housing coupled to the lead screw, a first pulley coupled to the nut housing, and a cable coupled to the first pulley and having a terminal end attached to the lift assembly, wherein rotation of the lead screw by the motor causes the nut housing and the first pulley to together move along the lead screw and the lift assembly to move along the length of the riser apparatus.

23. The apparatus according to claim 22, wherein the apparatus includes first and second rails, wherein the lift assembly is moveably coupled to the first and second rails, and wherein rotation of the lead screw by the motor causes the nut housing to move along the lead screw and the lift assembly to move along the first and second rails.

24. The apparatus according to claim 23, wherein the cable has a second end attached to a dead end location at a second end of the lead screw opposite the first end, wherein at least one second pulley is provided adjacent the first end of the lead screw and at least one third pulley is provided at the dead end location, and wherein the cable passes from the lift assembly, through the at least one second pulley, then through the at least one third pulley, and then through the first pulley to the dead end location.

25. The apparatus according to claim 23, wherein an amount of movement of the cable is double an amount of movement of the nut housing along the lead screw.

* * * * *